United States Patent [19]

Metroka et al.

[11] Patent Number: 5,148,471
[45] Date of Patent: Sep. 15, 1992

[54] COMMUNICATIONS DEVICE WITH VOICE RECOGNITION AND MOVABLE ELEMENT CONTROL INTERFACE

[75] Inventors: Michael P. Metroka, Algonquin; Robert K. Krolopp, Lisle, both of Ill.

[73] Assignee: Motorola, Inc., Schaumburg, Ill.

[21] Appl. No.: 439,993

[22] Filed: Nov. 20, 1989

[51] Int. Cl.⁵ .................... H04M 11/00; H04M 1/64
[52] U.S. Cl. ...................................... 379/58; 379/56; 379/61; 379/67; 379/88
[58] Field of Search ................... 379/58, 63, 433, 43, 379/193, 393, 190, 88, 67

[56] References Cited

U.S. PATENT DOCUMENTS

| | | |
|---|---|---|
| 3,476,886 | 11/1969 | Ferrari et al. |
| 3,551,607 | 12/1970 | Tommasi |
| 3,821,718 | 6/1974 | Padgeri .............................. 379/193 |
| 4,018,998 | 4/1977 | Wegner |
| 4,348,550 | 9/1982 | Pirz et al. |
| 4,471,493 | 9/1984 | Schober |
| 4,731,811 | 3/1988 | Dubus .................................... 379/58 |
| 4,737,976 | 4/1988 | Borth et al. .......................... 379/58 |
| 4,845,772 | 7/1989 | Metroka et al. ...................... 379/61 |
| 4,876,708 | 10/1989 | Saegusa et al. ...................... 379/61 |
| 4,949,374 | 8/1990 | Ishii et al. ............................. 379/88 |
| 4,959,850 | 9/1990 | Marvi ................................... 379/58 |
| 4,972,454 | 11/1990 | Toki et al. ............................ 379/58 |
| 5,042,063 | 8/1991 | Sakanishi et al. .................... 379/88 |

FOREIGN PATENT DOCUMENTS 0293264 11/1988 European Pat. Off. ............. 379/58

OTHER PUBLICATIONS

Motorola, Inc., Users Manual No. 68P81121E82-0: "Digital Voice Caller", Sep. 1988.
Matsushita Communication Industrial Co., Ltd, Technical Information for Microphone Model WM-55D103, Jun. 4, 1984.
Knowles Electronics, Inc., BW-1789 Application Notes, Mar. 1, 1974.
Realistic Owner's Manual: Duofone ET-415 Cordless Electronic Telephone; Cat. No. 43-444; 1984.
Panasonic KX-T3000 Easa-Phone Cordlessphone FCC Transmitter Type Acceptance Filing-Exhibits D, E, F, and H of Type Acceptance No. ACJ96NKX-T3000.
IBM Technical Disclosure Bulletin vol. 28, #4, Sep. 1985, p. 176S.

Primary Examiner—James L. Dwyer
Assistant Examiner—William Cumming
Attorney, Agent, or Firm—Raymond A. Jenski

[57] ABSTRACT

A portable radiotelephone with an integral voice recognition circuit is disclosed. Control of the voice recognition circuit is achieved with a foldable housing element which, in a closed position, covers an external keypad and control buttons. When the foldable housing element is in an open position, the portable radiotelephone is placed in an off-hook condition, the voice recognition circuit is activated, and the acoustic transducers are coupled to the voice recognition circuit. When the foldable element is in a closed position, the portable radiotelephone is placed in an on-hook condition, the voice recognition circuit is deactivated, and the electroacoustic transducers are coupled to the radiotelephone. A rapid closing and opening of the foldable element results in the voice recognition circuit being deactivated while the portable radiotelephone remains in the off-hook condition.

2 Claims, 8 Drawing Sheets

COMMUNICATIONS DEVICE WITH VOICE RECOGNITION AND MOVABLE ELEMENT CONTROL INTERFACE

BACKGROUND OF THE INVENTION

The present invention is generally related to a portable telephone apparatus, and more particularly to a cellular portable radiotelephone utilizing a movable housing element to permit the user to answer and terminate telephone calls and control various radiotelephone functions by opening or closing the movable element. This invention is related to that disclosed and claimed in U.S. patent application Ser. No. 439,983 filed on Nov. 20, 1989 and assigned to the assignee of the present invention.

Telephones having a rotary or pushbutton dial mechanism and other buttons integral to the handset portion have become commonplace in landline subscriber telephone instruments. This integral arrangement offers the telephone user the convenience of bringing the user interface mechanism and control buttons close to the user.

Radiotelephone operation, such as that offered in cellular radiotelephone or in cordless telephone sets, provide a mobility to the telephone user which landline telephone does not provide. The absence of a cord and the small size of the portable radiotelephone unit enables the user to carry the unit essentially wherever the user goes. Recent innovations have enabled voice recognition circuitry to be used with portable radiotelephones in order to provide the user the ability to dial and control the operation of a portable radiotelephone with the spoken voice. Undesired operation of voice recognition circuitry in a radiotelephone setting, however, may turn the equipment on or off, cause transmission of unwanted signals and prevent use of a radio channel, or cause undesired functions to occur. Such undesired activation of voice recognition is likely to engage functions which reduce the operating life of the battery which powers the portable radiotelephone.

Additional drain upon the battery of the radiotelephone is made by the apparatus providing illumination for the dial keypad and number display. Previously, in order to activate the portable telephone's display or backlighting, the user would have to press a button which would initiate a function, digit, etc. The user would then have to press a clear button to delete this function or digit. Such an operation provides an unwanted opportunity for error and may, for example, have enabled the user to inadvertently erase the contents of the scratch pad memory used for dialing a call. A user, having experienced an undesired operation caused by an inappropriate press of a clear button, quickly becomes discouraged from using the otherwise useful illumination feature.

SUMMARY OF THE INVENTION

The present invention overcomes these problems by using the hookswitch in the movable flip element to activate and deactivate the voice recognition circuit.

Accordingly, it is one object of the present invention to provide a portable radiotelephone which uses a movable flip element to place the portable radiotelephone in an on-hook or an off-hook condition.

It is another object of the present invention to provide a portable radiotelephone, which uses a movable flip element to enable and disable the voice recognition circuit.

It is a further object of the present invention to provide a portable radiotelephone which deactivates the voice recognition circuitry while maintaining a telephone call when the flip element is briefly closed then opened.

It is a further object of the present invention to utilize noise cancelling for a flip element microphone to enhance the performance of a voice recognition circuit.

DETAILED DESCRIPTION OF THE PREFERRED EMBODIMENT

Figures 1, 2, 3C:
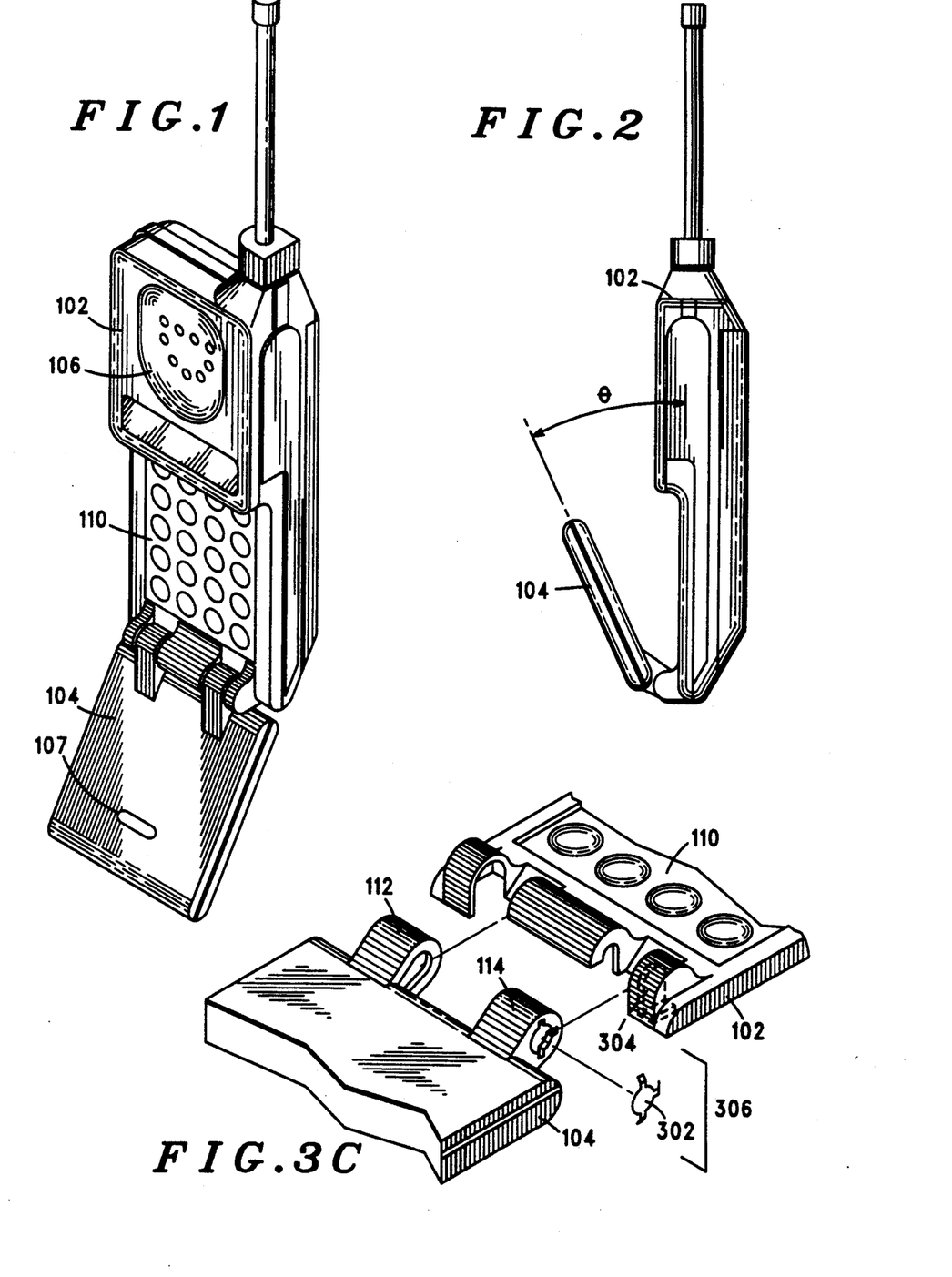
FIG. 1 is an isometric drawing of a portable radiotelephone which may employ the present invention.
FIG. 2 is a side view of the portable radiotelephone of FIG. 1 depicting operation of the movable flip element.
FIG. 3C is a diagram of the hookswitch switch mechanism which may be employed in the radiotelephone of FIG. 1.

A portable radiotelephone adapted to be used in a cellular radiotelephone system is shown in FIG. 1. This portable unit consists of two readily apparent portions, a body portion 102 and a flip element portion 104. The drawing of FIG. 1 shows the flip element portion 104. The drawing of FIG. 1 shows the flip element 104 in an "open" position such that a user of the portable unit may listen via earpiece 106 and may speak into the microphone port 107. The dial or keypad 110 consists of a plurality of buttons numbered one through zero, #, and *, in a familiar telephone arrangement as well as additional function buttons such as "send", "end", "clear", "on-off", and other buttons associated with memory recall. Volume control buttons (not shown) may adjust the volume of the earpiece and/or the ringer. Operation of such a portable radiotelephone and flip element has been described in U.S. Pat. No. 4,845,772, assigned to the assignee of the present invention.

When the flip element 104 is open as shown in FIG. 1, the portable cellular telephone can be in the state of answering or making a telephone call. Such a state is commonly known as "off-hook". (It should be noted that in a cellular preorigination dialing system an additional operator activity is required to place a call: upon entering a telephone number to be dialed either via the keypad 110 or by recognition of digits or names by a voice recognition circuit, the send button must be depressed in order to activate the portable unit's transmitter and to complete the call. In the preferred embodiment, the send button may also be electronically activated by the voice recognition circuit and can be used to answer a call if the flip element is already open). Upon completion of the telephone call, the user may hang up the portable telephone (go "on-hook") by moving the flip element 104 into a stowed position, that is, rotated about the axis of hinges 112 and 114 so that the flip element 104 rests nearly against keypad 110. This action activates a hookswitch (HKS) which causes the telephone call to be terminated. Depression of the end button or an equivalent operation by the voice recognition circuit without closing the flip element may also terminate the call.

Activation of the hookswitch occurs in the preferred embodiment when the angle between the body 102 and the flip element 104 equals approximately 45°. The closing of the flip element 104 can best be perceived in FIG. 2. The hookswitch in the preferred embodiment is located between the flip element 104 and the body portion 102 and may be seen in the detail of FIG. 3C. A contact 302 consisting of a conventional conductive spring material is disposed in hinge 114 of flip element 104 and rotates with the flip element 104. A printed circuit board element 304 is disposed in the body portion 102 in a position such that the contact 302 presses against the circuit board element 304. Metallization disposed on printed circuit board element 304 is positioned such that when the flip element 104 is opened to an angle of 45°, an electrical connection is completed between the metallization through the contact 302 to ground. In the preferred embodiment, the combination of the contact 302 and the printed circuit board element 304 is the hookswitch (HKS) 306.

Figure 3A:
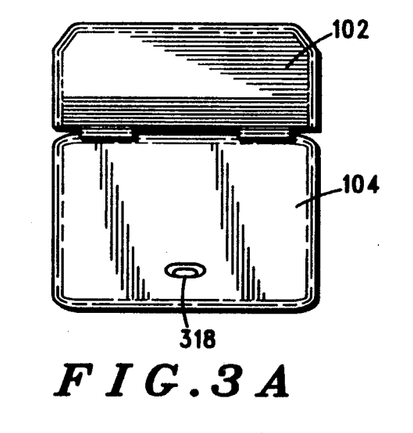
FIG. 3A is a bottom plan view of the portable radiotelephone of FIG. 1, illustrating the noise cancelling port.
Figure 3B:
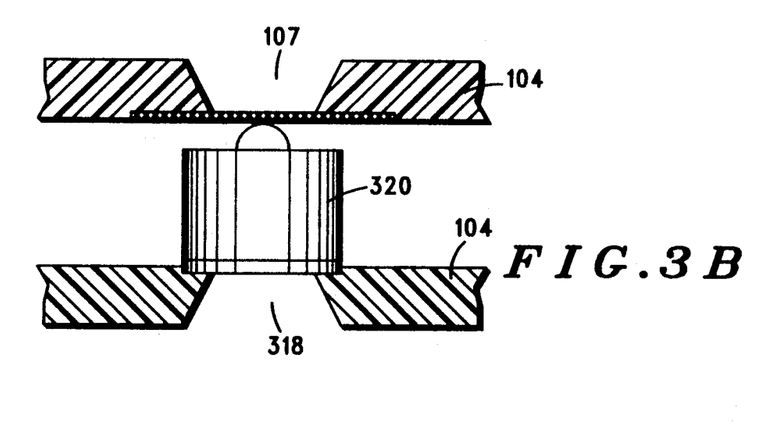
FIG. 3B is a cross-section of the flip element of the portable radiotelephone of FIG. 1, illustrates a noise cancelling microphone disposed therein.

The portable radiotelephone, when viewed in bottom plan in FIG. 3A, shows the acoustic port 318 in the housing of flip element 104 which enables ambient noise to enter and be presented to a noise cancelling microphone element. A noise cancelling microphone element 320 is illustrated in the cross section of the flip element 104 shown in FIG. 3B. Speech acoustic energy preferentially enters the acoustic port 107 disposed on the inside surface (the surface closest to the user's mouth when the flip element 104 is in the open position) of flip element 104. Ambient noise enters both acoustic port 107 and acoustic port 318 and is accepted by microphone element 320 in a manner which conventionally results in the cancellation of ambient noise. Such noise cancelling operation is briefly described in Application Note BW-1789 from Knowles Electronics, Inc. (dated May 1, 1974). In the preferred embodiment, microphone element 320 is a model WM-55D103 microphone available from Matsushita Communications Industrial Co., Ltd., Yokohama, Japan.

Figure 4:
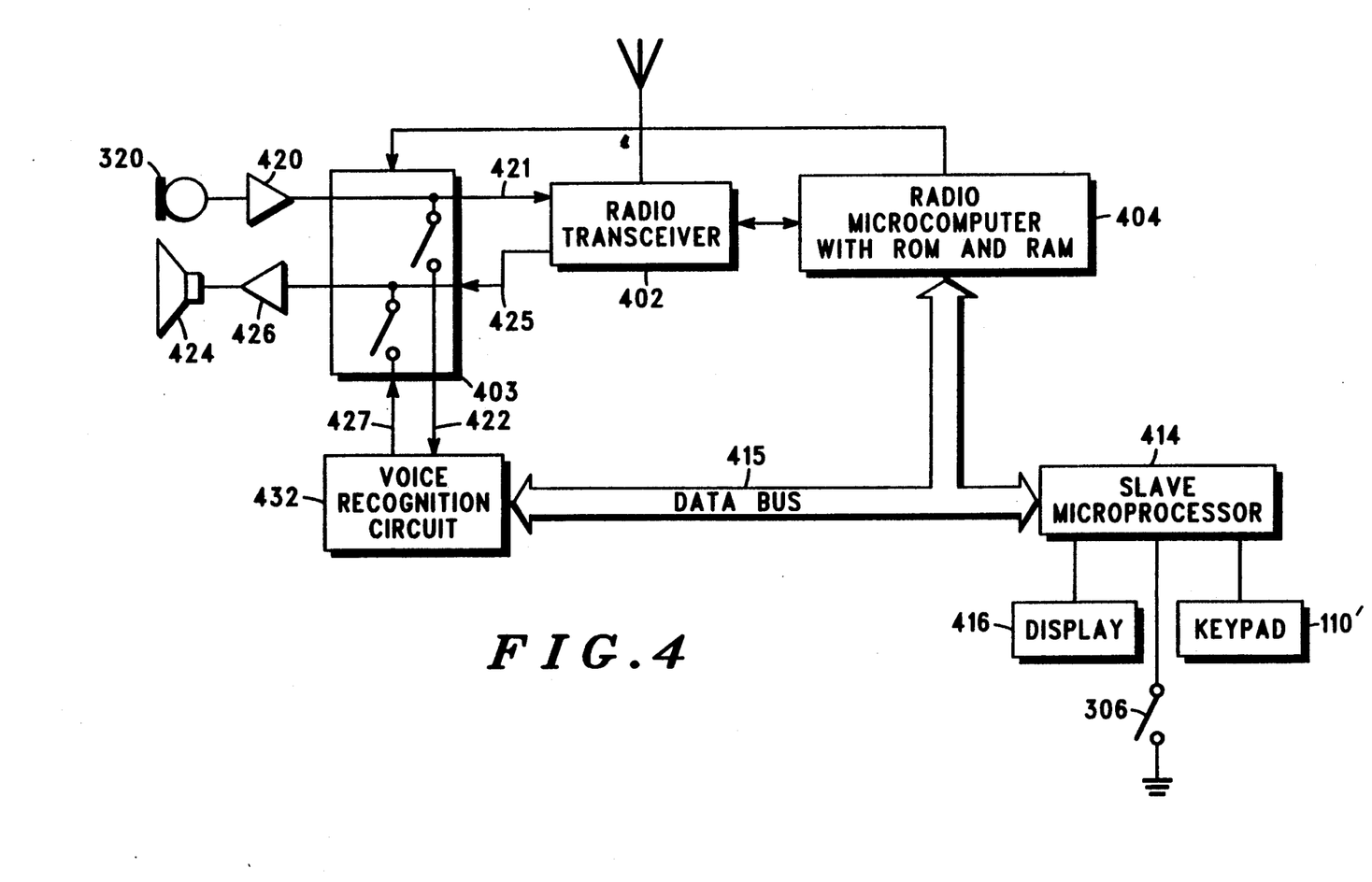
FIG. 4 is a block diagram of the electronic elements of a portable radiotelephone embodying the present invention.

Referring to FIG. 4, there is illustrated an electrical block diagram of a cellular portable radiotelephone embodying the present invention. Such a portable radiotelephone includes a cellular radiotelephone transceiver 402 operable in cellular radiotelephone systems, internal microphone 320 and speaker 424, which are switchably coupled to the radio transceiver 402 and a voice recognition circuit 432 by a conventional controlled switch circuit 403, radio microcomputer 404 with conventional RAM (storing pertinent cellular telephone call parameters) and conventional ROM (storing control software), a slave microcomputer 414 including conventional ROM with control software for controlling display 416 and keypad 110', and the voice recognition circuit 432. The radio microcomputer 404, slave microcomputer 414, and voice recognition circuit 432, are coupled to and communicate with one another by way of a three-wire data bus 415, which operates as described in U.S. Pat. Nos. 4,369,516 and 4,616,314 (incorporated herein by reference). The foregoing transceiver and microcomputer blocks may be conventional blocks of commercially available portable radiotelephones, such as, for example, the "MICROTAC PT" Cellular Telephone available from Motorola, Inc. The "MICROTAC PT" Cellular Telephone is described in further detail in operators manual no. 68P81150E49, published by and available from Motorola C & E Parts, 1313 East Algonquin Road, Schaumburg, Ill. 60196.

Audio signals are converted into electrical signals by internal microphone 320 and are coupled by amplifier 420 and switch circuit 403 to the radio transceiver 402 via conductor 421. These signals are then used to modulate the transmitter of transceiver 402 in conventional fashion. Likewise, signals received by the receiver of transceiver 402 are coupled via conductor 425 to switch circuit 403, audio amplifier 426 and subsequently to a speaker 424 for conversion to acoustic signals.

When the portable radiotelephone is in the voice recognition mode, the signals from microphone 320 are coupled to voice recognition circuit 432 by switch circuit 403 via conductor 422. Audio signals generated by the voice recognition circuit 432 are coupled via conductor 427 to switch circuit 403 for connection to amplifier 426 and speaker 424.

In the preferred embodiment, two interconnected microcomputer systems are utilized to control the basic functions of the portable radiotelephone (the radio microcomputer 404) and to control the keypad and display functions (the slave microcomputer 414). The slave microcomputer 414 is shown in more detail in the schematic of FIG. 5. The slave microcomputer 414 consists of a microprocessor 502 which, in the preferred embodiment, is an MC68HC05C4 microprocessor (which also has on-board memory). The basic function of the slave microprocessor is to provide interface to the user of the portable radiotelephone via keypad 110', display 416, and other buttons, indicators, and illumination backlighting. The slave microprocessor 502 is coupled to a multi-segment display 416 which, in the preferred embodiment, is a conventional LED eight digit display. The slave microprocessor 502 is also coupled to a keypad matrix of buttons 110' which enables the portable radiotelephone user to input (dial) telephone numbers, store and recall telephone number information, and perform other radiotelephone functions (such as initiate a telephone call). In the preferred embodiment, one of the keys, 508, of the matrix 110' is specially dedicated to the function of turning the power on and off. Power on/off is accomplished by a momentary switch closure (by key 508) to ground which activates on/off circuitry. Volume increase switch 509 and volume decrease switch 511 are electrically coupled to the slave microprocessor 502 as part of the row/column matrix. Their physical location is away from the keypad 110' to allow for greater user convenience.

The function which is normally performed by a hookswitch (HKS) in a conventional landline telephone is performed in the portable radiotelephone of the present invention as previously described in relation to FIG. 3C. The hookswitch is shown schematically as switch 306 in FIG. 5. A DC (Direct Current) circuit is made or broken by HKS 306 to ground and applied to microprocessor 502. Furthermore, a pulse is generated from any change of state of the HKS 306 by a transistor 510 capacitors 512 and 514 and resistors 516, 518, and 519. The output of transistor 510 is taken from the collector and applied to the interrupt request (IRQ) input and the keypad column inputs of microprocessor 502 having a negative duration of approximately 10 microseconds. Microprocessor 502 stores the status of HKS 306 and provides an indication of the change of state of HKS 306 to the radio microprocessor 404.

Communication between the slave microprocessor 502 and the radio microprocessor 404 is maintained on a data bus 415. This data bus 415 is coupled to the radio microprocessor 404 as shown in FIG. 4. Another function which also shares the data bus 415 is the voice recognition circuit 432.

Figure 5:
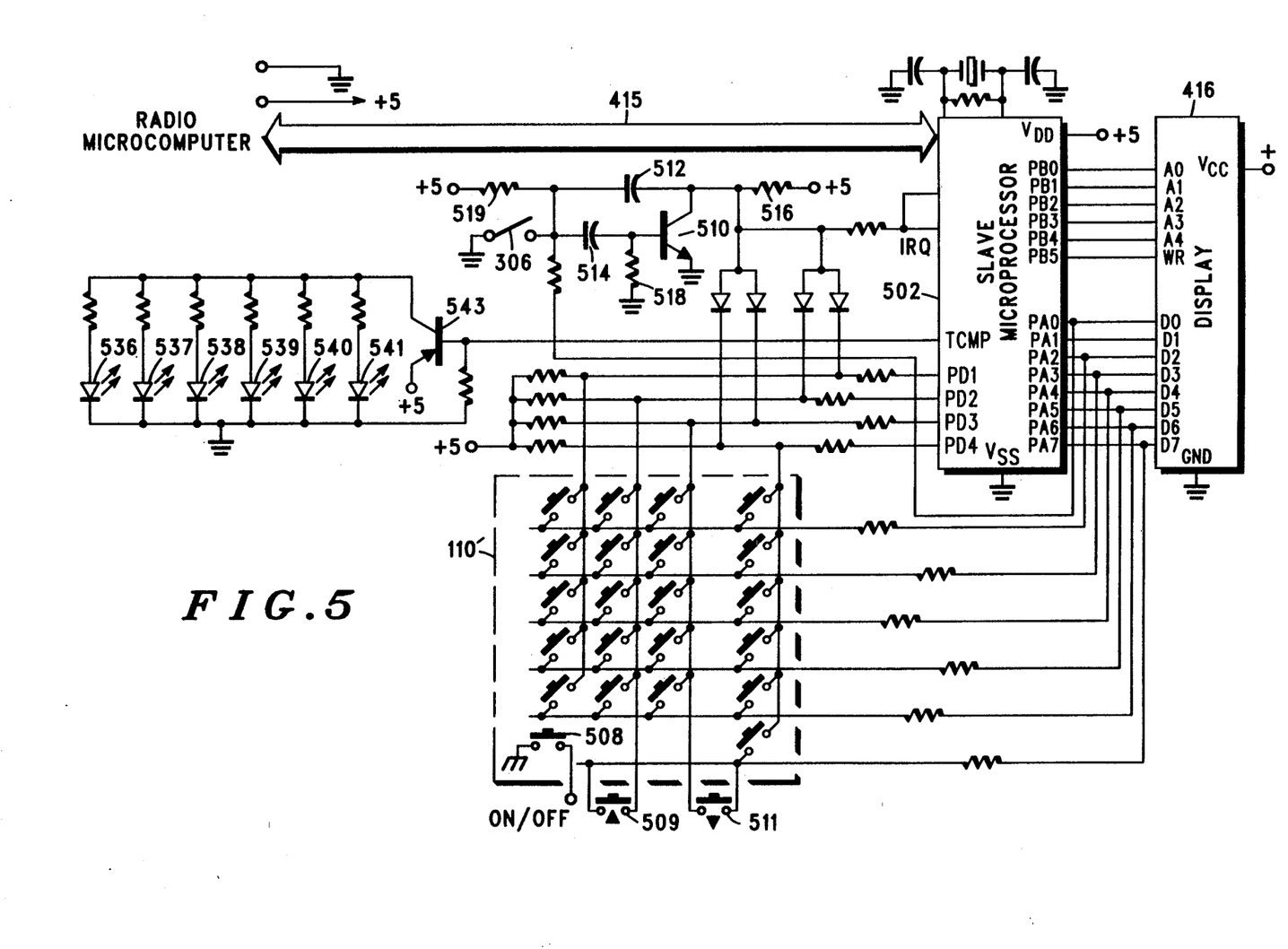
FIG. 5 is a schematic diagram of the slave microprocessor and associated circuitry employed in the portable radiotelephone of FIG. 4.

Assuming that the portable radiotelephone has been powered-up and the flip element has been opened to enable the HKS, a keypad 110' pushbutton activation by the portable radiotelephone user results in a communication between the slave microprocessor 502 and the radio microcomputer 404 via the bus 415. The slave microprocessor 502, in the preferred embodiment, communicates that a closure has occurred between a particular row and a particular column corresponding to the key pressed by the user. The radio microcomputer 404 may then take the appropriate action, such as returning a digit instruction via bus 415 for the slave microprocessor 502 to cause the display 416 to illuminate or otherwise display a character. Thus, the slave microprocessor 502 is commanded by the radio microcomputer 404 or the user in order to complete an assignment.

Figure 6:
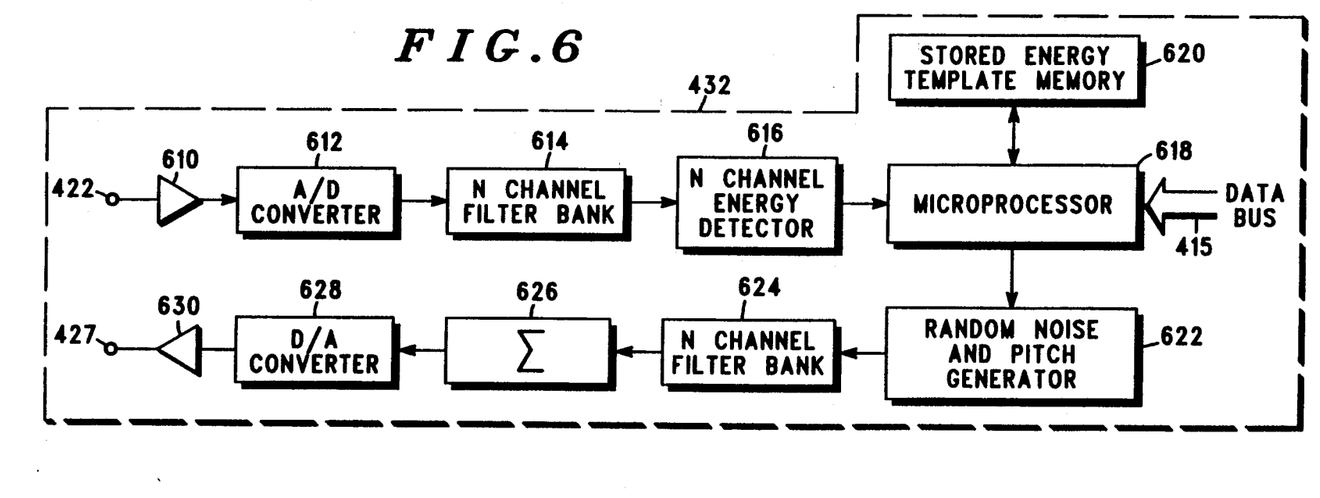
FIG. 6 is a block diagram of the voice recognition circuitry which may be employed in the portable radiotelephone of FIG. 4.

Referring now to FIG. 6, there is illustrated a block diagram of a voice recognition circuit 432 which may be utilized in the present invention. When the voice recognition circuits are activated, microphone audio from a microphone is input via conductor 422 to amplifier 610 where the gain is increased to an appropriate input level for the A/D converter 612. The A/D converter 612 digitizes the amplified analog input signal from amplifier 610. The digitized signal from A/D converter 612 is fed to a filter bank 614 comprised of 'n' bandpass filters whose responses overlap at the 3dB response points. The output from each of the filter bank channels is fed to an 'n' channel energy detector 616 where the amplitude of the signal in each bandpass response is detected. The detected level from each energy detector, at 616, is fed to conventional microprocessor 618 for comparison with a stored energy template from memory 620. Upon successful correlation of the microphone input signal with the stored template, microprocessor 618 sends an appropriate command on the data bus 415 to the radio microprocessor 404. In this manner, a spoken command such as a telephone number to be dialed or a "send" or "end" command may be entered to control radiotelephone operation. Synthesized voice replies from the voice recognition circuits are initiated by microprocessor 618 by sending control signals to a random noise generator and pitch generator circuit 622. Signals from these generators are fed to an 'n' channel filter bank 624 which comprises 'n' narrow bandpass filters. The output of these filters are added together in a summer block 626 whose output is then fed to a D/A converter 628 where the digital signal is converted to an analog signal. This analog signal is amplified to an appropriate level with amplifier 630 and output via conductor 427 for connection to amplifier 426 and speaker 424 so that the user will hear the synthesized voice responses. The voice recognition circuit is activated and deactivated by the radio microprocessor 404 by sending commands to the voice recognition microprocessor 618 over the data bus 415. Similar voice recognition circuits are further disclosed in U.S. Pat. Nos. 4,797,929; 4,817,157; and 4,870,686, U.S. patent application Ser. Nos. 266,293 ("Word Spotting in a Speech Recognition System Without Predetermined Endpoint Detection" filed on behalf of Gerson on Oct. 31, 1988), 294,098 ("Digital Speech Coder Having Improved Vector Excitation Source" filed on behalf of Gerson on Jan. 6, 1989), and 399341 ("Method for Terminating a Telephone Call by Voice Command" filed on behalf of Gerson et al. on Aug. 25, 1989); and International Publication Nos. WO/87/07748 and WO 87/07749 (Dec. 17, 1987). The use of a similar voice recognition circuit with a cellular radiotelephone is described in Motorola, Inc. User's Manual 68P81121E82-O "Digital Voice Caller", September, 1988.

Illumination for the keypad 110 is provided, in the preferred embodiment, by a plurality of light emitting diodes (LEDs) indicated by diodes 536–541 in FIG. 5. LEDs 536–541 are conventionally supplied from battery+via current limiting resistors and switch transistor 543. Switch transistor 543 is coupled to the TCMP port of slave microprocessor 502 and is enabled/disabled in accordance with the stored program of slave microprocessor 502. The LEDs are physically mounted behind the keypad 110 shown in FIG. 1 and provide a backlighting to the keys to aid the user in selecting keys in dim lighting conditions.

Although the preferred embodiment has been implemented employing three microprocessors, this should not be a limitation of the invention for it is possible to implement the present invention in a single microprocessor should the designer so desire. For either a single microprocessor or a multiple microprocessor system, the microprocessors may be interrupt driven in order to save battery power.

Figure 7A:
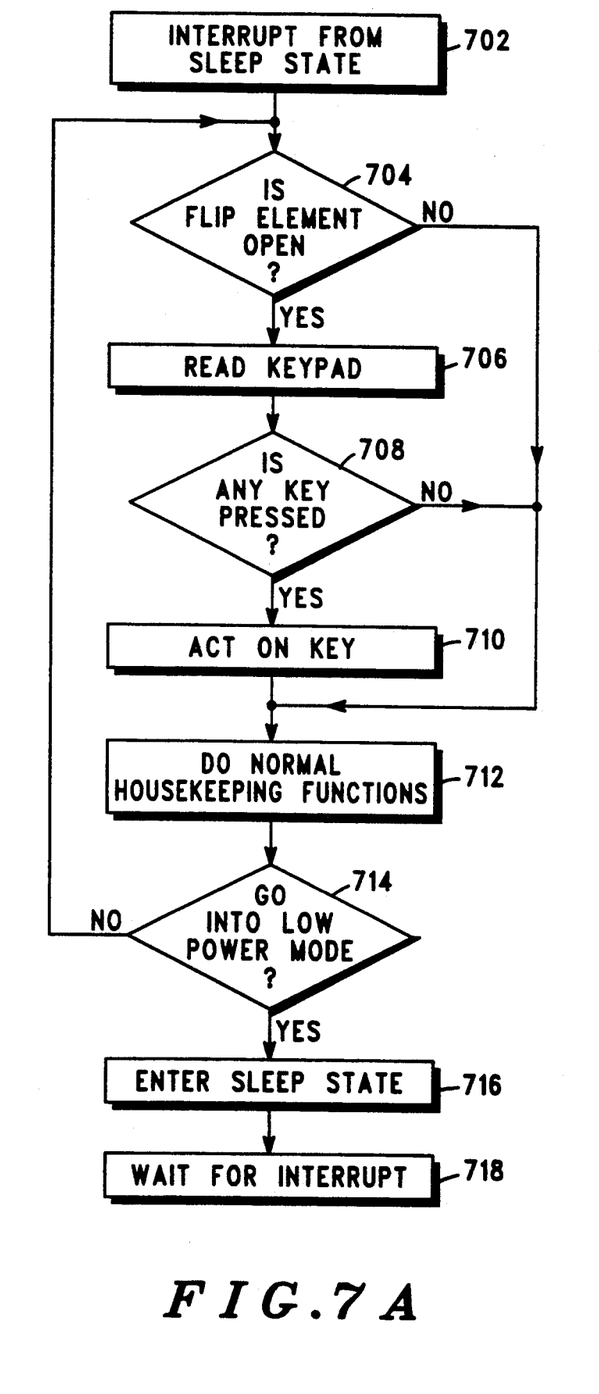
FIGS. 7A and 7B are a flowchart depicting the process of hookswitch operation of the slave microprocessor.

The process of FIG. 7A, therefore, commences with an interrupt due to a change of state of the hookswitch 306 to enable the microcomputer system at 702. A determination is made, at 704, whether the flip element is open or closed. If the flip element is open, then the keypad 110 is read to determine which key has been closed at 706. If a key has been depressed, at 708, then the function or character designated by the key is acted upon at 710. If a keypad 110 key has not been depressed, then no action is taken and the microcomputer system resumes its normal functions of controlling the transceiver, the display, and other housekeeping chores as shown at 712. If it is determined that the flip element is not open (at 704), then any keypad key depression is considered to be spurious and is ignored by progressing directly from the determination block at 704 to the normal housekeeping functions block at 712. The entire process is repeated for a predetermined period of time until a determination is made that the microcomputer system should go into a low power consumption mode as determined at 714. The microcomputer system is put into a "sleep" state at 716 and only the low power functions await for an interrupt signal at 718.

If the microcomputer system is implemented as a radio microcomputer and a slave microcomputer, the slave microprocessor 502 can send either a flip element closed indication or a flip open indication to the radio microcomputer, a detection of those indications is necessary by the radio microcomputer.

Figure 7B:
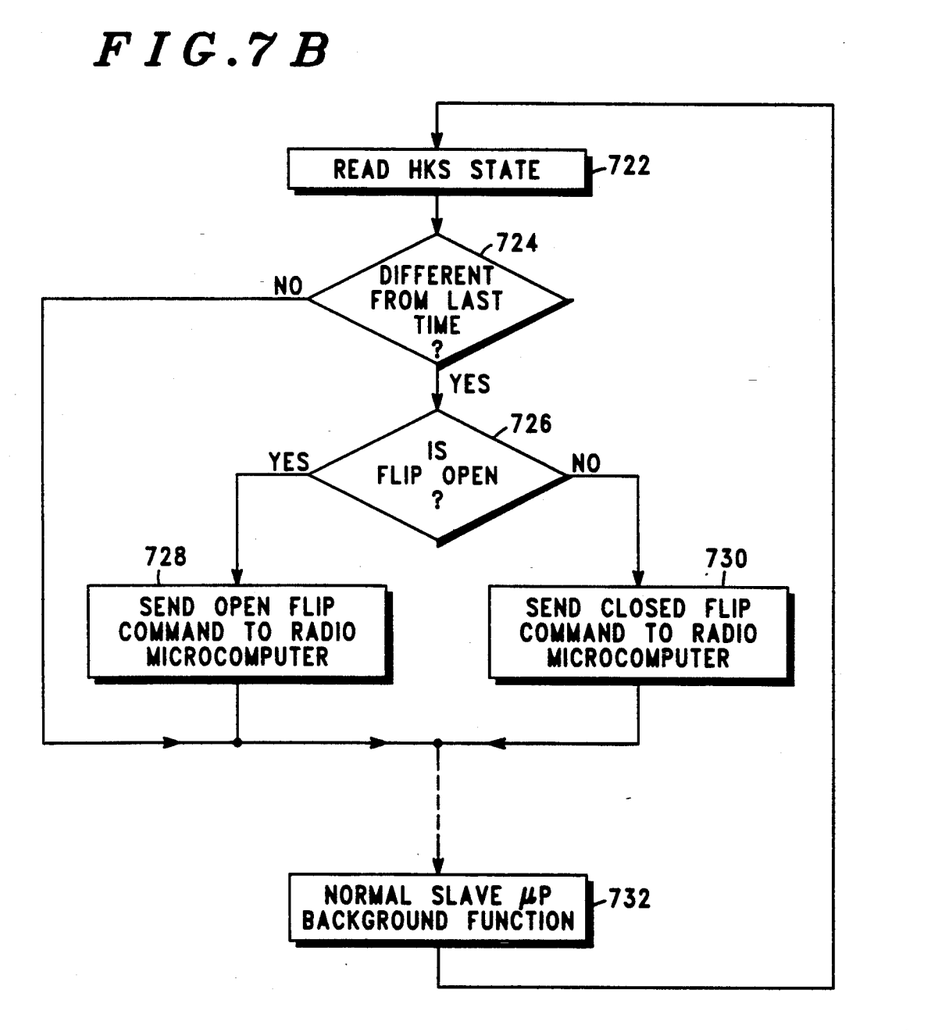

The slave microprocessor 502 determines, as part of its routine of chores, whether the hookswitch has changed state by comparing the current state against the stored state at 722 and 724 of FIG. 7B. If the state is different, then a determination is made, at 726, whether the flip element is open or closed. If the flip element is determined to be open, then an open flip element command is transmitted to the radio microcomputer at 728 and the slave microprocessor returns to its normal background functions at 732. If the determination at 726 yields a closed flip element, then a closed flip element command is conveyed to the radio microcomputer at 730 and the slave microprocessor returns to its normal background functions at 732. In either case the radio microcomputer 404 maintains the flip element state in its associated storage and the slave microprocessor 502, as part of its routine of chores, checks for a keypad enable or a keypad disable command received from the radio microcomputer 404. Thus, if the flip element is determined to be open, then the keys of the keypad are read in conventional fashion. If the flip element is determined to be closed, then the keys of the keypad are ignored.

Figure 8A:
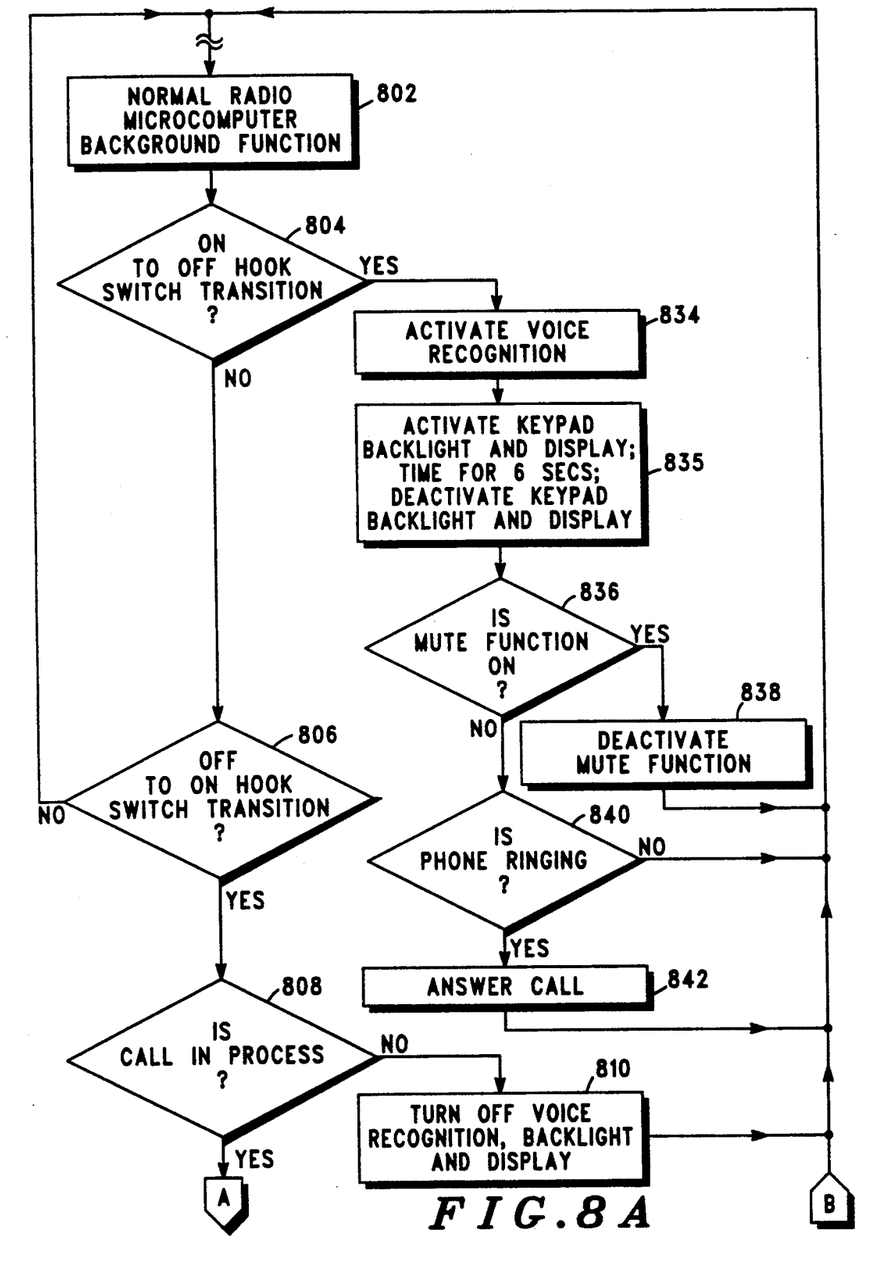
FIGS. 8A and 8B are a flowchart depicting a process of interpreting hookswitch operation of the master microprocessor.
Figure 8B:
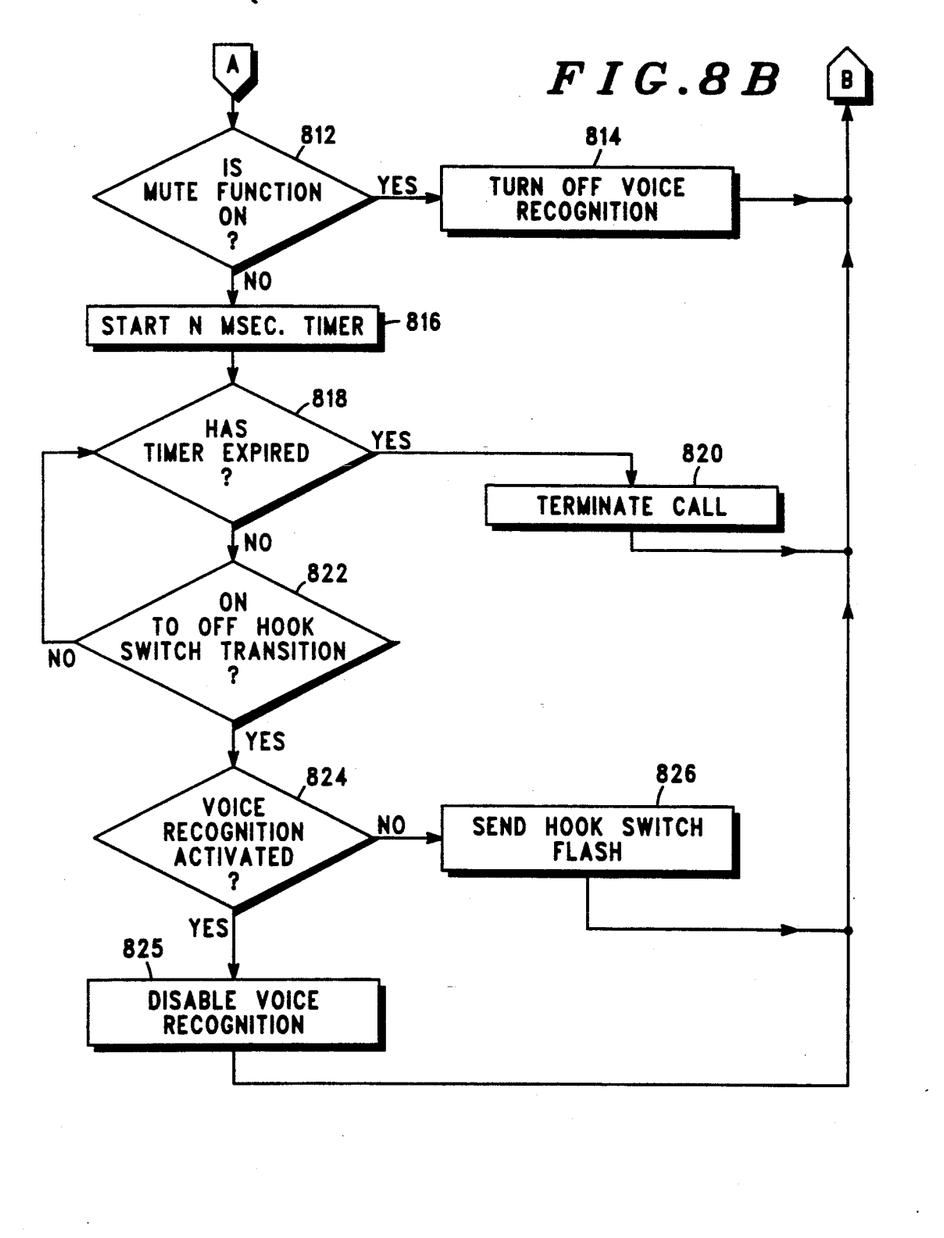

The process followed by the radio microcomputer 404 in realizing the present invention in the preferred embodiment is shown in FIGS. 8A and 8B. The radio microprocessor 404, as part of its routine of chores, at 802, checks for a on-hook to off-hook transition at 804. If an on-hook to off-hook transition has not occurred then flow proceeds to determination block 806 where a test is made to determine if an off-hook to on-hook transition has occurred. If none has occurred, then flow returns to the normal background functions at 802. If it is determined that an off-hook to on-hook transition has occurred at 806 indicating that the movable element 104 is in the closed position, then flow proceeds to determination block 808 where a test is made to determine if a telephone call is presently in progress. If it is determined that a call is not presently in progress, then flow proceeds to 810 where the voice recognition circuitry is disabled, the backlighting is inactivated, and the display is inactivated. Thus, if the movable flip element 104 is closed while a call is not in progress, then the voice recognition circuitry, the backlighting, and the display are inactivated. Optionally, the display may remain activated for a period of six seconds before being deactivated by such a off-hook to on-hook transition. From 810, flow returns to the normal background functions at 802. If a determination is made that a call is in progress, at 808, then flow proceeds to determination block 812. A test is made, at 812, of whether the microphone mute function is on. If the microphone is muted, then flow proceeds to 814 where the voice recognition circuitry is disabled. Thus, when the movable element 104 is closed while a call is in progress and the microphone is muted, the voice recognition circuitry is disabled. Flow proceeds from block 814 to 802 where flow returns to the normal background functions. If it is determined, at 812, that the microphone is not muted, then flow proceeds to block 816 where a timer of 'n' milliseconds is started. This timer runs until it has either expired or the movable flip element is reopened. After the counter is started, flow proceeds to determination block 818 where a test is made to determine whether the timer has expired. If the timer has expired then the flow proceeds to block 820 where the telephone call is terminated. Thus, if the movable element is closed for longer than 'n' milliseconds while a call is in progress and the microphone is not muted, then the call is terminated. In the preferred embodiment, the timer duration 'n' is 1000 milliseconds. Flow proceeds from block 820 to 802 where flow returns to the normal background functions. If it is determined, at 818, that the timer has not expired, then flow proceeds to determination block 822 where a test is made of whether an on-hook to off-hook transition has occurred. If no on-hook to off-hook transition has occurred, then flow returns to determination block 818. Flow continues in the 818-822 loop until either the timer expires or an on-hook to off-hook transition occurs. If a determination is made, at 822, that an on-hook to off-hook transition has occurred prior to the timer expiring, then flow proceeds to determination block 824. A determination is made at decision block 824 whether the voice recognition circuit has been enabled. If the voice recognition circuit has been enabled, it is then disabled, at block 825, before the process returns to the normal background functions at 802. If the voice recognition circuit is not enabled at this time, then the process proceeds to block 826 where a hookswitch flash signal is sent. Thus, if the telephone is presently engaged in a call with the microphone not muted and the movable flip element 104 is momentarily closed and then re-opened prior to the timer expiring, then either the voice recognition circuit is disabled or a hookswitch flash signal is sent. From 826, flow returns to the normal background functions at 802.

If it is determined, at 804, that an on-hook to off-hook transition occurred then the flow proceeds to block 834 where the voice recognition circuitry is activated. The process, then, at 835, activates the keypad backlighting illumination and the display 416 for a conventionally timed period of six seconds. Thus, if the master microcomputer is performing normal background functions and an on-hook to off-hook transition occurs, then the voice recognition circuitry is activated, the keypad backlighting is activated, the display is activated. The flow continues to determination block 836. A test is made, at 836, to determine whether the microphone mute function is on. If it was determined, at 836, that the microphone is muted, then flow proceeds to block 838 where the microphone is unmuted. Thus if the microphone is in the muted state with the movable element closed, opening the movable element will unmute the microphone, from 838 flow returns to the normal background functions at 802.

If it is determined, at 836, that the microphone is not muted, then flow proceeds to determination block 840. A test is made, at 840, to determine whether the portable radiotelephone is currently ringing. If it is determined, at 840, that the portable radiotelephone is not ringing, indicating that there is no incoming call, then the process flow returns to the normal background functions at 802. If it is determined, at 840, that the radiotelephone is ringing, then the process flow proceeds to block 842 where the incoming call is answered. Thus, if the telephone is ringing while the movable flip element 104 is closed and the movable element 104 is then opened, the incoming call is answered. From 842, flow returns to the normal background functions at 802.

Thus, then, a portable radiotelephone having the capability of enabling and disabling voice recognition circuitry in response to the position of a flip element has been shown and described. The flip element, which covers a keypad and other control buttons when in a closed position, produces an off-hook condition via a hookswitch when moved to an open position. While a particular embodiment of the invention has been shown and described, it is to be understood that the invention is not to be taken as limited to the specific embodiment herein, and that changes and modifications may be made without departing from the true spirit of the invention. It is contemplated therefore to cover the present invention, and any and all such changes and modifications, by the appended claims.

We claim:

1. A portable radiotelephone apparatus having a voice recognition circuit and further having a housing with a movable member and a fixed member having an earpiece electroacoustic transducer disposed therein, the movable member having a contracted first position and an extended second position, the portable radiotelephone apparatus comprising:

means for producing an off-hook signal in the portable radiotelephone apparatus when the movable member is in the second position;

means, responsive to said off-hook signal, for activating the voice recognition circuit;

means for producing an on-hook signal in the portable radiotelephone apparatus if the movable member is in the first position;

means for initiating a telephone call after said off-hook signal has been produced; and means for deactivating an activated voice recognition circuit but maintaining said telephone call when the movable member is placed in the first position and subsequently returned to the second position within a predetermined period of time.

2. A method of control of a voice recognition circuit in a portable radiotelephone apparatus having a keypad disposed on an outer surface and a movable member which covers the keypad when the movable member is placed in a first position and which exposes the keypad when the movable member is placed in a second position, comprising the steps of:

producing an off-hook signal in the portable radiotelephone apparatus if the movable member is in the second position;

activating the voice recognition circuit in response to said step of producing an off-hook signal;

producing an on-hook signal in the portable radiotelephone apparatus if the movable member is in the first position;

initiating a telephone call after said off-hook signal has been produced; and deactivating an activated voice recognition circuit but maintaining said telephone call when the movable member is placed in the first position and subsequently returned to the second position within a predetermined period of time.

* * * * *